United States Patent [19]

Nishiyama et al.

[11] Patent Number: 5,389,287

[45] Date of Patent: Feb. 14, 1995

[54] ANTIFERROELECTRIC LIQUID CRYSTAL COMPOSITE MATERIAL, PROCESS FOR PREPARING THE SAME, AND LIQUID CRYSTAL ELEMENT USING THE SAME

[75] Inventors: Shinichi Nishiyama; Mitsuko Nagai; Hideo Hama; Tooru Yamanaka, all of Sodegaura, Japan

[73] Assignee: Mitsui Petrochemical Industries, Ltd., Tokyo, Japan

[21] Appl. No.: 90,820

[22] Filed: Jul. 13, 1993

[30] Foreign Application Priority Data

Jul. 14, 1992 [JP] Japan .................................. 4-186690
Apr. 28, 1993 [JP] Japan .................................. 5-103249

[51] Int. Cl.⁶ ..................... C09K 19/52; C09K 19/32; G02F 1/13
[52] U.S. Cl. ....................... 252/299.01; 252/299.61; 252/299.62; 252/299.63; 252/299.64; 252/299.65; 252/299.66; 359/51; 359/52; 359/94
[58] Field of Search ..................... 252/299.01, 299.61, 252/299.62, 299.63, 299.64, 299.65, 299.66, 299.67; 359/51, 52, 94

[56] References Cited

FOREIGN PATENT DOCUMENTS 0422996 4/1991 European Pat. Off. .
0431929 6/1991 European Pat. Off. .
0465048 1/1992 European Pat. Off. .
62-260841 11/1987 Japan .

OTHER PUBLICATIONS

WPI/Derwent, Week 9212, AN 92-091287, Abstract of Japanese Laid-Open Patent Publication No. 04-029219 (Jan. 31, 1992).
Patent Abstracts of Japan, vol. 12, No. 143 (Apr. 30, 1988), Abstract of Japanese Laid-Open Patent Publication No. 62-260841 (Nov. 13, 1987).
Molsen, et al., "Antiferroelectric Switching in Polymer-Dispersed Liquid Crystals", Japan J. Appl. Phys., vol. 31, L1083-L1085 (1992).

*Primary Examiner*—Shean Wu
*Attorney, Agent, or Firm*—Sherman and Shalloway

[57] ABSTRACT

An antiferroelectric liquid crystal composite material comprising an organic polymer and an antiferroelectric liquid crystal material, both being in the dispersed state; a process for preparing a liquid crystal element including a step of mixing an organic polymer and an antiferroelectric liquid crystal material; and a liquid crystal element having such a structure that the above-mentioned antiferroelectric liquid crystal composite material is sandwiched between a pair of electrodes are provided. According to the present invention, there can be obtained a liquid crystal element which is available at a low price, quick in the electrooptical response, free from occurrence of switching failure and is able to make a large display screen.

14 Claims, 3 Drawing Sheets

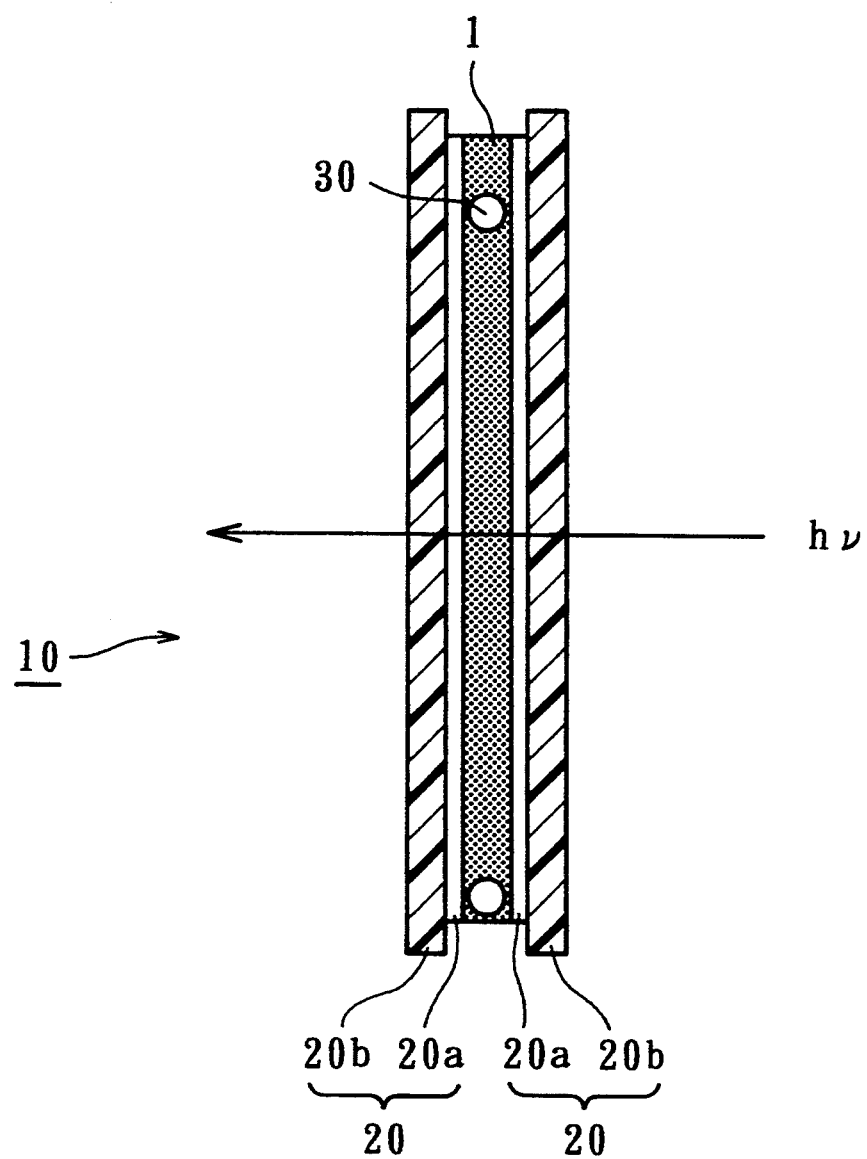

ANTIFERROELECTRIC LIQUID CRYSTAL COMPOSITE MATERIAL, PROCESS FOR PREPARING THE SAME, AND LIQUID CRYSTAL ELEMENT USING THE SAME

FIELD OF THE INVENTION

The present invention relates to an antiferroelectric liquid crystal composite material comprising an organic polymer and an antiferroelectric liquid crystal material, a process for preparing the antiferroelectric liquid crystal composite material and a liquid crystal element or device using the antiferroelectric liquid crystal composite material.

BACKGROUND OF THE INVENTION

In liquid crystal display devices, speed-up of a display speed is now requested, and multiplex driving of the liquid crystal display devices is also requested. Further, in optical switching elements, speed-up of an optical switching speed is requested.

On that account, regarding to light reflection type liquid crystal elements wherein an intensity of a reflected light from a liquid crystal element surface such as a display panel of a liquid crystal display device is electrically changed, it is desired that the electrooptical change of the reflected light intensity can be made at a high speed. Also in the case of using a liquid crystal element as the optical switching element, it is desired that an electrooptical change of an intensity of a transmitted light passing through the liquid crystal element can be made at a high speed.

However, when the light reflection type liquid crystal element or the light transmission type liquid crystal element is a liquid crystal element of TN type or STN type, this liquid crystal element is long in the response time required for the electrooptical change, for example, the response time is about several millisec. to several tens millisec.

In order to shorten the response time of the liquid crystal element to not longer than several tens microsec., use of a ferroelectric liquid crystal material instead of a nematic liquid crystal material in the liquid crystal element of TN type or STN type has recently been tried.

In the liquid crystal element using the ferroelectric liquid crystal material, spontaneous polarization of the ferroelectric liquid crystal compound is utilized to give rise to the electrooptical change.

If a voltage is applied to the above-mentioned liquid crystal element to arrange a direction of the spontaneous polarization of the ferroelectric liquid crystal compound in a given direction and to maintain this state, an internal electric field is formed inside the ferroelectric liquid crystal material owing to the polarization. This internal electric field hinders the ferroelectric liquid crystal material from electrical transference of from a certain state to other state. For this reason, after a voltage is applied to the liquid crystal element containing the ferroelectric liquid crystal material for a long period of time, the intensity of the reflected light from the liquid crystal element surface or the intensity of the transmitted light passing through the liquid crystal element cannot return to its initial state when a reverse voltage is applied thereto, as far as the level of the reverse voltage is low. Thus, the liquid crystal element using the ferroelectric liquid crystal material has a drawback of switching failure.

In contrast therewith, a liquid crystal element using an antiferroelectric liquid crystal material has been proposed recently, and an improvement of a drawback of the liquid crystal element using the ferroelectric liquid crystal material, for example, the above-mentioned switching failure, has been tried.

However, the liquid crystal element using the antiferroelectric liquid crystal material has no optical memory properties, and hence if application of a voltage to the liquid crystal element is stopped, the intensity of the reflected light from the liquid crystal element surface or the intensity of the transmitted light passing through the liquid crystal element returns naturally to its initial state. Therefore, when the antiferroelectric liquid crystal material is used for a display panel of a liquid crystal display device, there is involved such a drawback that a displayed image cannot be retained unless a bias voltage is applied to the material.

In the liquid crystal element using the ferroelectric liquid crystal material or the antiferroelectric liquid crystal material, orientation properties of the liquid crystal material filled between electrodes of the liquid crystal element are deteriorated at the central portion between the electrodes, unless the distance between the electrodes is adjusted to not more than 2 $\mu$m. Hence, the liquid crystal element using the ferroelectric liquid crystal material or the antiferroelectric liquid crystal material has such a drawback that the response time cannot be shortened to not longer than several tens microsec.

In the liquid crystal elements of conventional types, namely, the TN type liquid crystal element, the STN type liquid crystal element and the liquid crystal element using the ferroelectric liquid crystal material, an intensity of a specific polarized light (i.e., polarized light having a fixed wave vector) contained in the reflected light from the liquid crystal element surface or an intensity of a specific polarized light contained in the transmitted light passing through the liquid crystal element is electrically changed utilizing the refractive index anisotropy or birefringence of the liquid crystal material contained in the liquid crystal element. For example, in the case of using any of the conventional type liquid crystal elements as an optical switching element, two polarizing plates (first and second polarizing plates) are generally provided before and behind the liquid crystal element, and a light passes through the first polarizing plate and the second polarizing plate successively to output only a specific polarized light.

Accordingly, in the conventional type liquid crystal elements, an optical loss of about 75% of the incident light usually occurs because of the two polarizing plates, and hence a sufficiently high change of light intensity cannot be obtained unless a powerful light source is used.

Further, in the case of using the conventional type liquid crystal elements, a large-sized display screen is hardly obtainable, so that they are unsuitable for light-adjusting sheets, light-adjusting glasses and large-sized screen displays.

Furthermore, when the liquid crystal material for the liquid crystal elements is made only of a liquid crystal compound, the production cost of the liquid crystal elements incorporating such liquid crystal material is high because the liquid crystal compound is expensive.

In order to eliminate the above-mentioned drawbacks, liquid crystal materials comprising a liquid crystal compound and an organic polymer have been recently proposed. For example, a liquid crystal material comprising a ferroelectric liquid crystal and an organic polymer is proposed in Japanese Patent Laid-Open Publication 260841/1987. Such liquid crystal materials comprise a liquid crystal compound and an organic polymer which is cheaper than a liquid crystal compound, and hence they are available at a lower price as compared with the liquid crystal materials made of only a liquid crystal compound.

In these liquid crystal materials, the organic polymer functions as a matrix for the liquid crystal compound, whereby the liquid crystal materials can be made in the form of a film. If a liquid crystal material in a form of film is used, a liquid crystal element having a large surface area can be readily prepared. Further, the liquid crystal element prepared by using the filmy liquid crystal material is very suitable for a light-adjusting sheet, a light-adjusting glass and a large-sized screen display.

However, the liquid crystal element using the liquid crystal material in a form of film, such as a liquid crystal element using a liquid crystal material comprising a ferroelectric liquid crystal compound and an organic polymer, has a drawback inherent in ferroelectric liquid crystal materials, for example, occurrence of switching failure.

In general, a difference in the refractive index between the liquid crystal compound and the organic polymer is large, and, therefore, a light scattering at the interface between the liquid crystal compound and the organic polymer occurs due to the difference in the refractive index. Accordingly, when the liquid crystal material of this kind is used for a display panel of a projection type large-sized screen display, there is involved such a drawback that an optical difference between the transparent state and the light-scattering state, namely, contrast, cannot be-made high.

The conventional liquid crystal element using a liquid crystal material comprising a liquid crystal compound and an organic polymer becomes a light-scattering state when no voltage is applied thereto, but becomes a transparent state when a voltage is applied thereto. Accordingly, for example, in a vehicle in which the liquid crystal element of this kind is used for a light-adjusting window glass, if an electric power is stopped for some reason or other at the time of applying a voltage to the liquid crystal element, the light-adjusting window glass becomes the light-scattering state to show opaque, resulting in a problem of safety.

OBJECT OF THE INVENTION

The present invention is intended to solve such problems associated with the prior art techniques as described above, and an object of the present invention is to provide a liquid crystal element which is available at a low price, quick in the electrooptical response, free from occurrence of switching failure and suitably used for a light-adjusting sheet, a light-adjusting glass and a large-sized screen display. Another object of the invention is to provide a liquid crystal composite material capable of forming the above-mentioned liquid crystal element and a process for preparing the liquid crystal composite material.

SUMMARY OF THE INVENTION

There is provided by the present invention an antiferroelectric liquid crystal composite material comprising an organic polymer and an antiferroelectric liquid crystal material (an antiferroelectric liquid crystal compound), said organic polymer and said antiferroelectric liquid crystal material being in the dispersed state.

There is also provided by the present invention a process for preparing an antiferroelectric liquid crystal composite material including a step of mixing an organic polymer with an antiferroelectric liquid crystal material.

There is further provided by the present invention a liquid crystal element comprising a pair of electrodes facing each other at least one of which is a transparent electrode and an antiferroelectric liquid crystal composite material filled between the electrodes, wherein the antiferroelectric liquid crystal composite material comprises an organic polymer and an antiferroelectric liquid crystal material, said organic polymer and said antiferroelectric liquid crystal material being in the dispersed state.

BRIEF DESCRIPTION OF THE DRAWING

FIG. 3 is a sectional view showing one example of a liquid crystal element according to the present invention.

DETAILED DESCRIPTION OF THE INVENTION

Figure 1A:
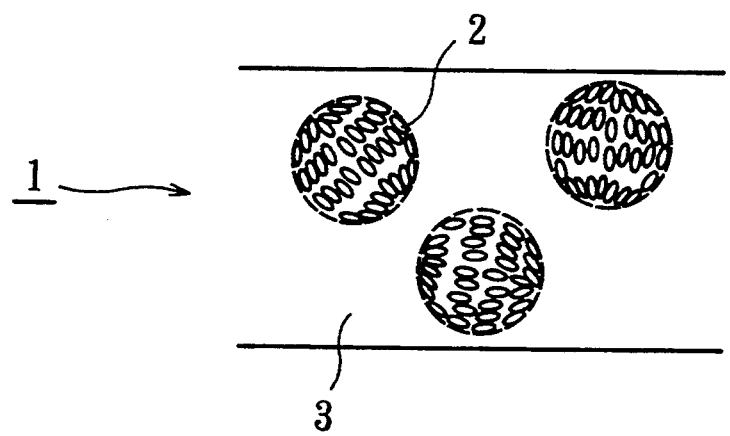
FIGS. 1a and 1b illustrate an embodiment of an antiferroelectric liquid crystal composite material according to the present invention.

The antiferroelectric liquid crystal composite material, the process for preparing the same and the liquid crystal element using the same according to the present invention are described in detail hereinafter.

Antiferroelectric Liquid Crystal Composite Material

The antiferroelectric liquid crystal composite material of the invention comprises an organic polymer and an antiferroelectric liquid crystal material, and the organic polymer and the antiferroelectric liquid crystal material are present in the dispersed state with each other.

In the antiferroelectric liquid crystal composite material of the invention, the organic polymer is transparent and is formed from an organic polymer composed of one or two or more kinds of (A) a thermoplastic resin, (B) a cured product of curable resin or compound, (C) an elastomer and (D) other polymer materials.

The thermoplastic resin (A) for forming the organic polymer includes:
polymers or copolymers of halogenated vinyl compound,
polymers or copolymers of unsaturated alcohols or unsaturated ethers,
polymers or copolymers of unsaturated carboxylic acids,
polymers or copolymers of compounds having unsaturated bond in alcohol residue,
polymers or copolymers of compounds having acid residue or acid residue and alcohol residue and having unsaturated bond in said residue,
polymers or copolymers of unsaturated nitriles,
polymers or copolymers of aromatic vinyl compounds,
polymers or copolymers of heterocyclic compounds,
polyesters, polyamides, polymers or copolymers of carboxylic anhydride derivatives, heat-resistant organic polymers, polyolefins (e.g., polyethylene, polypropylene, poly-4-methyl-1-pentene, polybutene-1)

Acrylonitrile-butadiene-styrene resins and the like, polyurethanes, and polyvinyl butyrals.

Concrete examples of the polymers or copolymers of halogenated vinyl compound include polyvinyl chloride, polyvinyl bromide, polyvinyl fluoride, vinyl chloride/vinyl acetate copolymer, vinyl chloride/ethylene copolymer, vinyl chloride/butadiene copolymer, vinyl chloride/acrylate copolymer, vinyl chloride/styrene/acrylonitrile terpolymer, vinyl chloride/vinylidene chloride/vinyl acetate terpolymer, polyvinylidene chloride, polytetrafluoroethylene, polytrifluoroethylene, polytrifluorochloroethylene and polyvinylidene fluoride.

Concrete examples of the polymers or copolymers of unsaturated alcohols or unsaturated ethers include polymers of unsaturated alcohols and copolymers thereof such as polyvinyl alcohol and polyallyl alcohol; and polymers of unsaturated ethers and copolymers thereof such as polyvinyl ether and polyallyl ether.

Concrete examples of the polymers or copolymers of unsaturated carboxylic acids include (co)polymers of acrylic acids and methacrylic acids.

Concrete examples of the polymers or copolymers of compounds having unsaturated bond in alcohol residue include polyvinyl esters such as polyvinyl acetate; and polyallyl esters such as polyphthalic acid.

Concrete examples of the polymers or copolymers of compounds having acid residue or acid residue and alcohol residue and having unsaturated bond in said residue include polyacrylic ester, polymethacrylic ester, maleic ester polymer, maleic ester copolymer, fumaric ester polymer and fumaric ester copolymer.

Concrete examples of the polymers or copolymers of unsaturated nitrile include acrylonitrile polymer, acrylonitrile copolymer, methacrylonitrile polymer, methacrylonitrile copolymer and vinylidene polycyanate.

Concrete examples of the polymers or copolymers of aromatic vinyl compounds include polystyrene, poly-α-methylstyrene, poly-p-methylstyrene, styrene-α-methylstyrene copolymer, styrene-p-methylstyrene copolymer, polyvinylbenzene and polystyrene halide.

Concrete examples of the polymers or copolymers of heterocyclic compounds include polyvinylpyridine, poly-N-vinylpyridine and poly-N-pyrrolidone.

Concrete examples of the polyesters include polycarbonate, and concrete examples of the polyamides include nylon-6, nylon-6,6 and poly-p-phenyleneterephthalamide Concrete examples of the polymers or copolymers of carboxylic anhydride derivatives include polymers of acid anhydrides such as maleic anhydride and fumaric anhydride, copolymers of these acid anhydrides, polymers of imide compounds of these acid anhydrides and copolymers of these imide compounds.

Concrete examples of the heat-resistant organic polymers include polyamideimide, polyether imide, polyimide, polyphenylene oxide, polyphenylene sulfide, polysulfone, polyether sulfone and polyacrylate.

Concrete examples of the polyolefins include polyethylenes such as low-density polyethylene, high-density polyethylene, linear low-density polyethylene, middle density polyethylene and modified polyethylene.

The organic polymer as mentioned before may be formed from a cured product of a curable resin or compound (B) which is compatible with the antiferroelectric liquid crystal material and having no reactivity with an antiferroelectric compound. The curable resins or compounds are comprised of polymerizable monomer and/or polymerizable oligomer. The curing reaction will proceed in the presence of a catalyst or in the absence of a catalyst.

Employable as the curable resins or compounds are heat-sensitive curable resins (or thermosetting resins) or compounds, and radiation-sensitive curable compounds (or photo polymerizable compounds) or resins which are sensitive to radiation of specific wavelength region such as visible light, ultraviolet light, infrared rays, electron beam and X rays and are polymerized and cured under irradiation with such radiation.

The curable compounds may also be polymerized in a presence of a photoinitiator.

Concrete examples of the heat-sensitive curable resins include unsaturated polyester resin, epoxy resin, phenol resin, urea resin, melamine resin, diallyl phthalate resin and silicone resin.

Concrete examples of the radiation-sensitive curable compounds include ultraviolet curable compound having ultraviolet sensitive group such as diazonium base in the molecule.

In the invention, also employable as the radiation-sensitive curable compounds are radiation-sensitive curable monomers such as trimethylolpropane triacrylate, tricyclodecanedimethanol diacrylate, polyethylene glycol diacrylate, polypropylene glycol diacrylate, hexanediol diacrylate, neopentyl glycol diacrylate and tris(acryloxyethyl)isocyanurate. These monomers are polymerized in the presence of a catalyst.

Preferably used are 2-hydroxy-3-phyenyl-propylacrylate and phenoxy polyethylene glycol acrylate having an aromatic ring.

Suitably used as the elastomers (C) for forming the organic polymer are organic polymers and copolymers having a tensile modulus at 23° C. of usually 0.1 to 2,000 $kg/cm^2$, preferably 1 to 1,500 $kg/cm^2$.

The elastomer (C) used in the invention has such properties as described below.

A glass transition temperature (Tg) of the elastomer (C) is usually in the range of $-150°$ to $+50°$ C. preferably $-80°$ to $-20°$ C.; an intrinsic viscosity [η] of the elastomer (C) as measured in decalin at 135° C. is usually in the range of 0.2 to 10 dl/g, preferably 1 to 8 dl/g; a density of the elastomer (C) is usually in the range of 0.82 to 0.96 $g/cm^3$, preferably 0.84 to 0.92 $g/cm^3$; and a crystallinity of the elastomer (C) as measured by means of X-ray diffractometry is usually not more than 30%, preferably not more than 25%.

Concrete examples of such elastomer (C) include polybutadiene rubber, styrene/butadiene copolymer rubber, acrylonitrile/butadiene copolymer rubber, ethylene/butadiene copolymer rubber and isoprene/isobutylene copolymer rubber.

Also employable as the organic polymer other than polymers of (A), (B) and (C) are polymers having carbazole skeleton such as polyvinylcarbazole; and cellulose such as methyl cellulose, ethyl cellulose and nitro cellulose.

Of these organic polymers, preferably used are organic polymers having high light-transmittance to visible lights and especially preferred are the cured products of curable resins or compounds (B).

The organic polymer as described above has a refractive index of usually 1.30 to 1.70, preferably 1.40 to 1.65.

The antiferroelectric liquid crystal composite material of the invention contains an antiferroelectric liquid crystal material in addition to the above-described organic polymer.

The antiferroelectric liquid crystal material is thought to be present in a form of aggregate which exhibits antiferroelectricity in the antiferroelectric liquid crystal composite material.

An antiferroelectric liquid crystal material (an antiferroelectric compound) is concretely represented by the following formula.

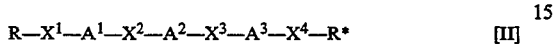

R—X¹—A¹—X²—A²—X³—A³—X⁴—R* [II]

In the formula [II], R is an alkyl group of 4 to 20 carbon atoms or a polyfluoroalkyl group of 4 to 20 carbon atoms. A part of —CH$_2$— group or —CF$_2$— group present in said alkyl or polyfluoroalkyl group may be substituted with at least one group selected from —O—, —S—, —CO—, —CHX— (wherein X is a halogen atom), —O—CO—, —O—COO—, —COO— and —CH=CH— so that hetero atoms are not bonded to each other. The alkyl or polyfluoroalkyl group may have any form of straight chain form, branched form and cyclic form.

R is preferably a straight chain alkyl group or a straight chain polyfluoroalkyl group, because its molecule is apt to take a rod-like structure and readily forms the antiferroelectric compound aggregate. Concrete examples of the straight chain alkyl group of 4 to 20 carbon atoms include hexyl group, heptyl group, octyl group, nonyl group, decyl group, undecyl group, dodecyl group, tetradecyl group, hexadecyl group and octadecyl group. Concrete examples of the straight chain polyfluoroalkyl group of 4 to 20 carbon atoms include groups obtained by substituting hydrogen in the above-mentioned alkyl groups with fluorine. These alkyl and polyfluoroalkyl groups may have optical activity.

In the above formula [II], X¹, X², X³ and X⁴ are each independently a group selected from —COO—, —OCO—, —CH$_2$CH$_2$—, —CH$_2$O—, —OCH$_2$—, —S—S—, —CO—CH$_2$—, —CH$_2$—CO—, —N-H—CO—, —CO—NH—, —CO—, —NH—, —O— and —S—, or a single bond.

Of these, preferable X¹ and X⁴ are each independently a group selected from —COO—, —OCO—, —CO— and —O—, or a single bond. Further, X¹ is particularly preferably —O—, —COO— or a single bond; and X⁴ is particularly preferably —COO—, —OCO—, —CO— or —O—. Preferable X² and X³ are each independently a group selected from —COO—, —OCO—, —CH$_2$CH$_2$—, —CH$_2$O— and —OCH$_2$—, or a single bond.

In the above formula [II], A¹, A² and A³ are each independently a single bond or a group selected from divalent groups represented by the following formulas.

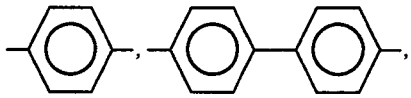

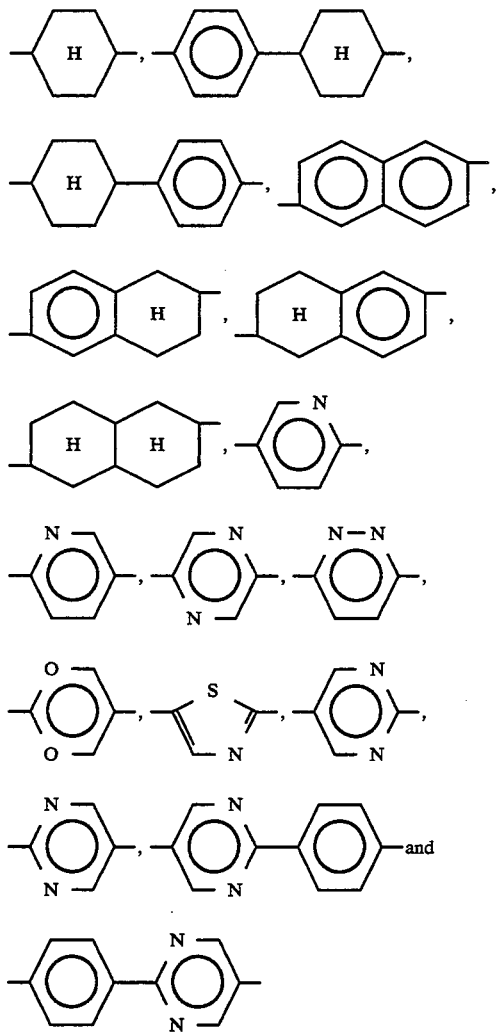

At least one group of A¹, A² and A³ is a divalent group selected from the above-mentioned cyclic compounds.

Of these, A¹ is preferably a group selected from groups represented by the following formulas.

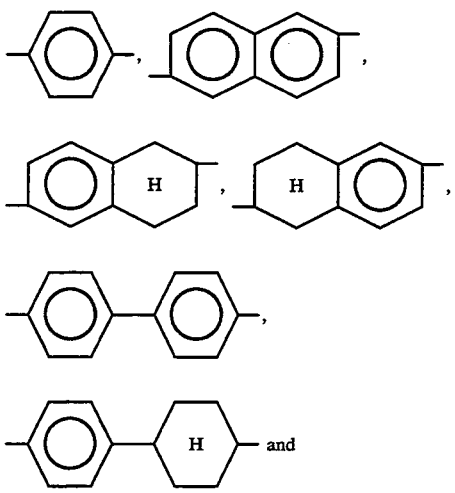

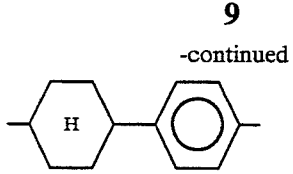

Preferable $A^2$ and $A^3$ are each independently a group selected from groups represented by the following formulas.

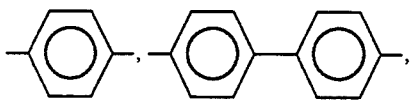

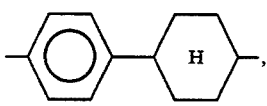

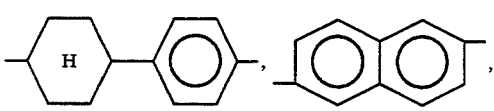

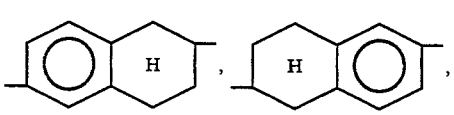

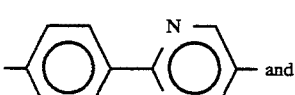

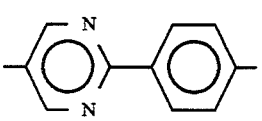

In the above formula [II], R* is an optically active group having 4 to 20 carbon atoms and having asymmetric carbon atom. To the asymmetric carbon atom of the optically active group may be bonded a halogen atom such as fluorine.

Further, R* is preferably an optically active group represented by the following formula [III].

   [III]

In the formula [III], $Q^1$ is —$(CH_2)_q$— in which q is an integer of 0 to 6; $Q^2$ and $Q^3$ are each independently an alkyl group of 1 to 10 carbon atoms, a polyfluoroalkyl group of 1 to 10 carbon atoms or a halogen atom; $Q^2$ and $Q^3$ are different from each other; and both of $Q^2$ and $Q^3$ are not halogen atoms.

A part of —$CH_2$— group or —$CF_2$— group present in $Q^1$, $Q^2$ and $Q^3$ may be substituted with at least one group selected from —O—, —S—, —CO—, —CHX— (wherein X is a halogen atom), —CHCN—, —O—CO—, —O—COO—, —COO— and —CH=CH— so that hetero atoms are not bonded to each other.

In the above formula [III], it is preferred that $Q^1$ is a single bond or —$CH_2$—, and $Q^2$ is —$CH_3$, —$CF_3$ or —$C_2H_5$.

As the group indicated by R* in the aforesaid formula [II], preferred are groups represented by the following formulas.

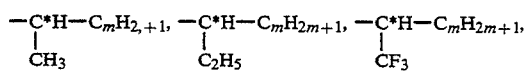

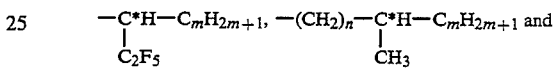

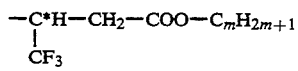

In the above formulas, m is an integer of 3 to 10, and n is 1 to 2.

Of the groups represented by the above formulas, R* is particularly preferably —C*H($CF_3$)—$C_6H_{13}$ or —C*H($CH_3$)—$C_6H_{13}$.

Among such antiferroelectric compounds as described above, preferably used is an antiferroelectric compound represented by the following general formula.

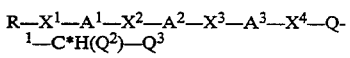   [I]

In the formula [I], R, $X^1$, $X^2$, $X^3$, $X^4$, $A^1$, $A^2$, $A^3$, $Q^1$, $Q^2$ and $Q^3$ are the same as those in the aforementioned formulas [II] and [III].

Of the compounds represented by the above formula [I], preferred as the antiferroelectric compound are compounds represented by the following formulas [1] to [15].

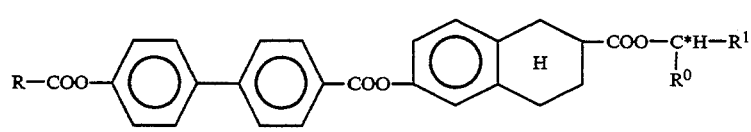   [1]

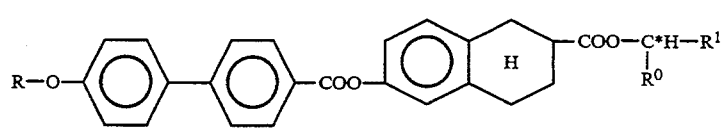   [2]

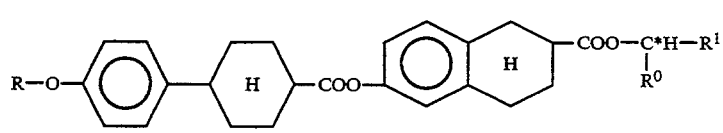   [3]

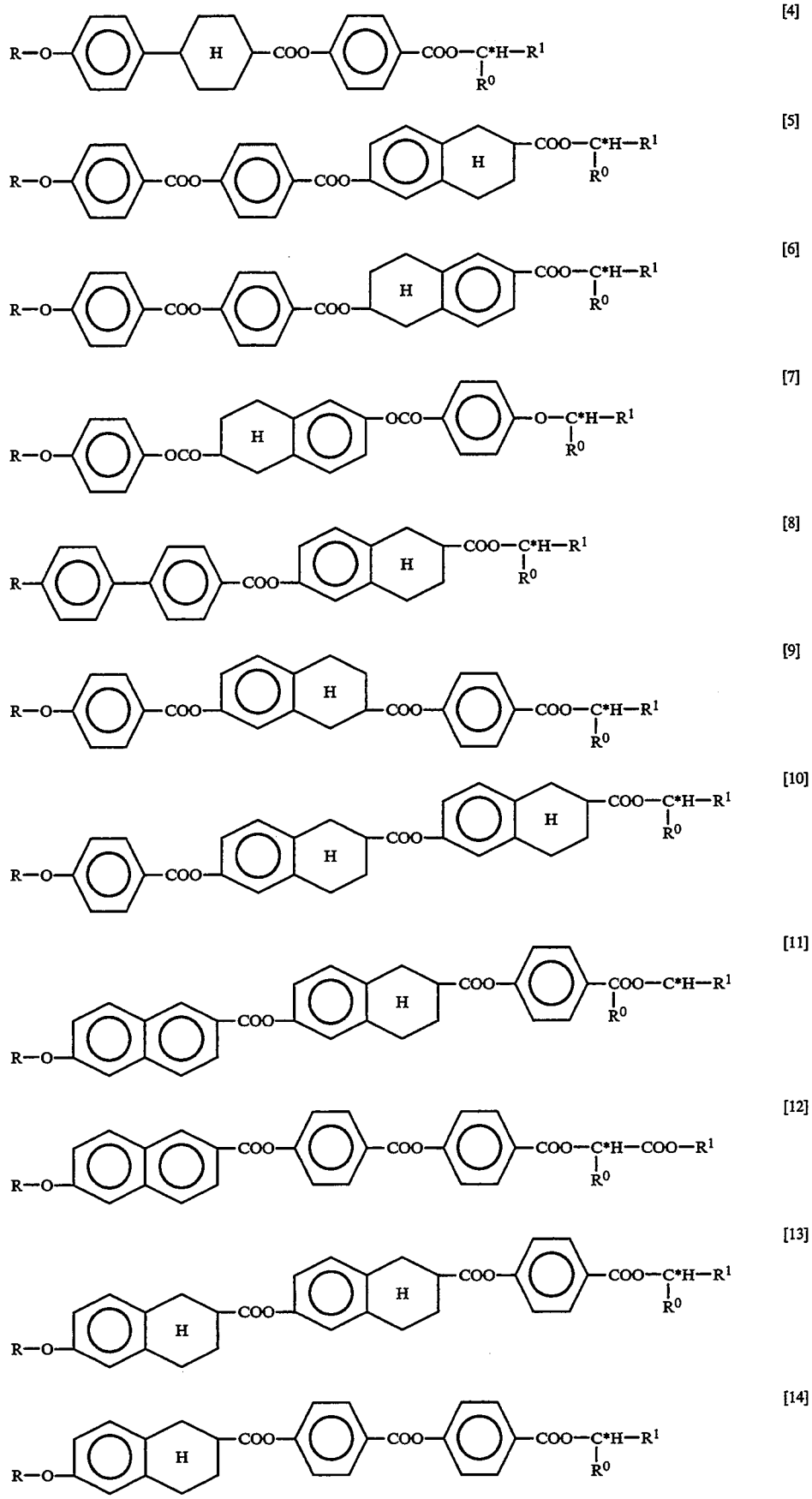

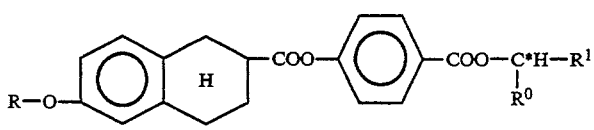
[15]

In the formulas [1] to [15], R is a hydrocarbon group of 5 to 20 carbon atoms which may have optical activity; $R^0$ is a group selected from methyl group, ethyl group and trifluoromethyl group; and $R^1$ is an alkyl group of 2 to 6 carbon atoms which is different from $R^0$.

Of the antiferroelectric compounds represented by the formula [I] or [II], particularly preferred are compounds of the formula [I], [II] or [III] wherein at least one of $A^1$, $A^2$ and $A^3$ is represented by the following formula.

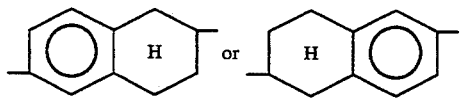

Concrete examples of such antiferroelectric compounds are given below.

The antiferroelectric compounds represented by the formula [I] or [II] can be synthesized, for example, by esterification reaction of an alcohol having an optically active group with a carboxylic acid, or transesterification reaction of an alcohol derivative having an optically active group with a carboxylic acid derivative.

Concrete examples of the antiferroelectric compounds, synthesis of the compounds, etc. are described in detail, for example, in Japanese Patent Laid-Open Publication No. 251556/1991 and in Japanese Patent Applications No. 331872/1990 (Jap. Laid-Open No. 202159/1992), No. 048475/1991 (Jap. Laid-Open No. 105644/1993), No. 136513/1991 (EP 431,929), No. 136514/1991 (Japan Laid-Open No. 360851/1992) and No. 347122/1991, all being previously filed by the present applicant.

The antiferroelectric liquid crystal material represented by the formula [I] or [II] exhibits an antiferro-

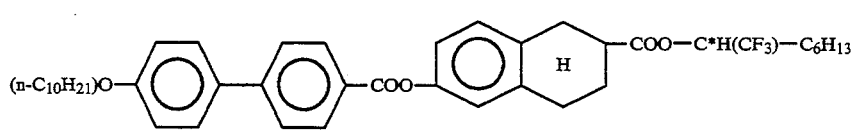
[2-1]

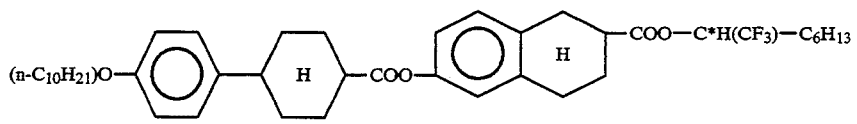
[3-1]

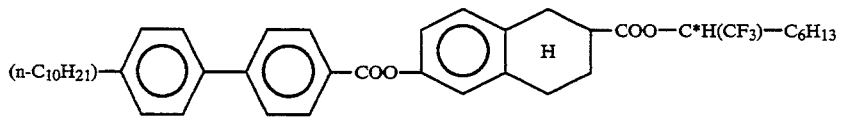
[8-1]

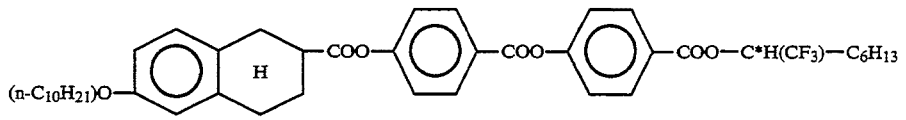
[14-1]

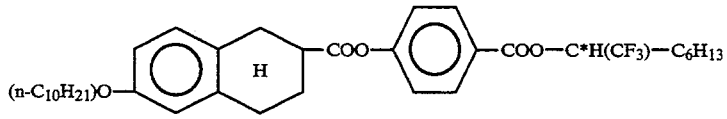
[15-1]

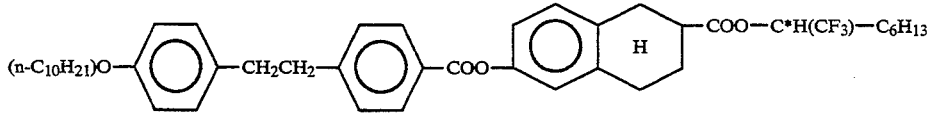

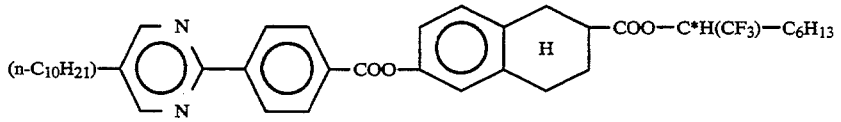

electric phase in the antiferroelectric liquid crystal composite material and has refractive index anisotropy.

The antiferroelectric liquid crystal material has a refractive index of usually 1.40 to 1.80, preferably 1.43 to 1.70.

As is evident from comparison of the refractive index of the antiferroelectric liquid crystal material with that of the organic polymer, a difference in the refractive index between the antiferroelectric liquid crystal material and the organic polymer can be made almost zero by appropriately selecting an organic polymer. When the difference in the refractive index between the antiferroelectric liquid crystal material and the organic polymer contained in the antiferroelectric liquid crystal composite material is almost zero, the antiferroelectric liquid crystal composite material has a high transparency.

As described hereinbefore, when orientation directions of the antiferroelectric liquid crystal material which are contained in the antiferroelectric liquid crystal composite material are different from each other, each of the antiferroelectric liquid crystal materials has refractive index anisotropy, whereby light scattering occurs in the antiferroelectric liquid crystal composite material, and hence the antiferroelectric liquid crystal composite material shows different transparency from that in the case where the antiferroelectric liquid crystal material is orientated in a given direction.

The difference in the transparency of the antiferroelectric liquid crystal composite material between the light-scattering state and the transparent state can be made, for example, electrooptically. Utilizing such properties, the antiferroelectric liquid crystal composite material of the present invention can be used for electrooptical liquid crystal elements such as a display panel of a liquid crystal display device, a light-adjusting sheet and a light-adjusting glass.

In the case of using the antiferroelectric liquid crystal composite material of the invention for such electrooptical liquid crystal elements as described above, when the antiferroelectric liquid crystal composite material is transparent state, the difference in the refractive index between the antiferroelectric liquid crystal material and the organic polymer contained in the antiferroelectric liquid crystal composite material is preferably within the range of 0 to ±0.15 in the transparent state. As described previously, the difference in the refractive index can be easily adjusted by appropriately selecting the compound for forming the antiferroelectric liquid crystal material and the organic polymer.

With regard to the difference in the transparency of the antiferroelectric liquid crystal composite material between the light-scattering state and the transparent state, there are provided by the invention two types of antiferroelectric liquid crystal materials, one is such an antiferroelectric liquid crystal composite material that the liquid crystal material interposed between two electrodes exhibits a light-scattering state as it is (namely applying no voltage) but is able to change to be transparent when a voltage is applied between the two electrodes one of which is transparent, and the other is such an antiferroelectric liquid crystal composite material that the liquid crystal material interposed between two electrodes is transparent when applying no voltage but is able to exhibit a light-scattering state when applying a voltage between two electrodes one of which is transparent.

When the antiferroelectric liquid crystal composite material is used for a liquid crystal element, particularly for a light-adjusting film or a light-adjusting glass, the antiferroelectric liquid crystal composite material is adjusted to have a thickness of 2 to 200 $\mu$m, preferably 5 to 100 $\mu$m, more preferably 7 to 40 $\mu$m.

A weight ratio between the organic polymer and the antiferroelectric liquid crystal material contained in the antiferroelectric liquid crystal composite material is usually in the range of 10:90 to 90:10, preferably 20:80 to 80:20. If the weight ratio between the organic polymer and the antiferroelectric liquid crystal material is adjusted to be in the above-mentioned range, orientation of the antiferroelectric liquid crystal material contained in the antiferroelectric liquid crystal composite material can be smoothly altered electrically without hindrance by the organic polymer.

When the amount of the organic polymer contained in the antiferroelectric liquid crystal composite material of the invention is large, the antiferroelectric liquid crystal composite material can be formed into a film. In contrast thereto, when the amount of the organic polymer contained in the antiferroelectric liquid crystal composite material is small, the antiferroelectric liquid crystal composite material becomes in a state of semi-solid.

Figure 1B:
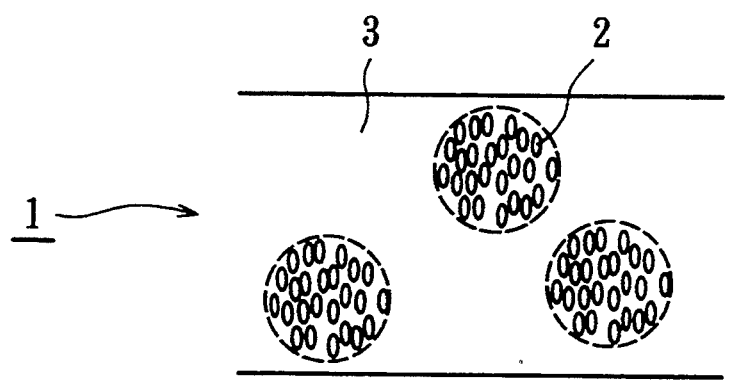
Figure 2A:
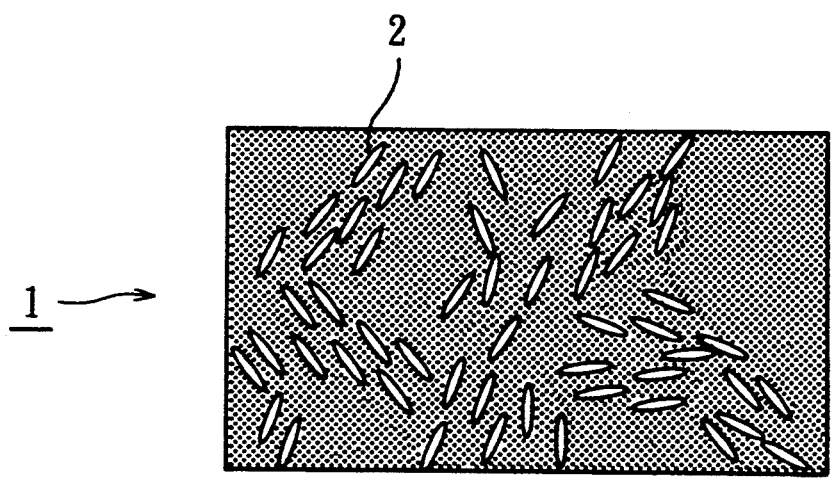
FIGS. 2a and 2b illustrate another embodiment of an antiferroelectric liquid crystal composite material according to the present invention.
Figure 2B:
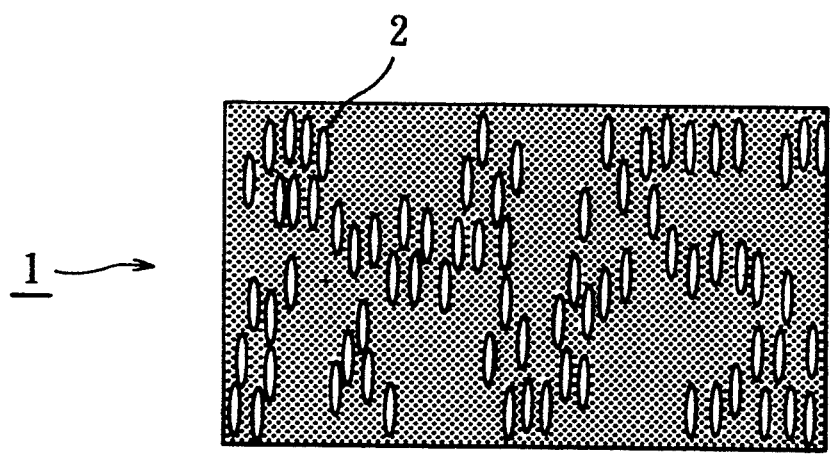

As described above, even if the amount of the organic polymer contained in the antiferroelectric liquid crystal composite material is large or small, the antiferroelectric liquid crystal material contained in the antiferroelectric liquid crystal composite material is dispersed in the form of plural droplets or domains. In other words, when the amount of the organic polymer contained in the antiferroelectric liquid crystal composite material of the invention is large as shown in FIG. 1(a) and FIG. 1(b), the antiferroelectric liquid crystal material 2 is dispersed in the organic polymer 3 in the form of droplets, a size of the droplets being about several times the wavelength of visible light. On the other hand, when the amount of the organic polymer contained in the antiferroelectric liquid crystal composite material of the invention is small, the antiferroelectric liquid crystal material 2 forms a continuous phase composed of continuous plural domains in the antiferroelectric liquid crystal composite material 1, and the organic polymer is dispersed in the antiferroelectric liquid crystal material 2 and forms a three-dimensional network.

The antiferroelectric liquid crystal composite material of the invention may contain other liquid crystal materials and additives if necessary, in addition to the organic polymer and the antiferroelectric liquid crystal material. For example, employable as the additives are those which are conventionally used for liquid crystal materials, such as conductivity imparting agents and life improving agents. Further, liquid crystal materials having no antiferroelectric phase may be added to the antiferroelectric liquid crystal composite material of the invention, as far as the antiferroelectric liquid crystal composite material of the invention can form an antiferroelectric phase. The liquid crystal material having no antiferroelectric phase may be made of only a liquid crystal compound having such properties or may be a composition containing a liquid crystal compound having such properties.

When the antiferroelectric liquid crystal composite material of the invention is used for a liquid crystal element, a small amount of an insulating spacer such as insulating inorganic particles or insulating inorganic fibers may be incorporated into the antiferroelectric liquid crystal composite material so that a distance between the electrodes is kept constant.

Preparation of antiferroelectric liquid crystal composite material

The antiferroelectric liquid crystal composite material of the invention is prepared through a step of mixing an organic polymer and the antiferroelectric liquid crystal material which is able to form the antiferroelectric compound aggregate in the antiferroelectric liquid crystal composite material, and if desired other components as mentioned before.

That is, the antiferroelectric liquid crystal composite material of the invention is prepared by mixing the organic polymer and the antiferroelectric liquid crystal material and if desired other components for a liquid crystal material to prepare a mixture, and molding the mixture into a film by means of dry or wet film forming, solution casting, solution coating, spreading on water, etc.

The term "organic polymer" used in this specification means such a material that the material is composed of at least one or two or more of the thermoplastic resin (A), the curable resin or compound (B) having no reactivity with the antiferroelectric compound and the elastomer (C) and other polymers. The material per se is an organic polymer or is able to form an organic polymer when cured.

Concrete examples of such organic polymer are those described hereinbefore.

In the case of using, for example, the thermoplastic resin (A) as the organic polymer, the antiferroelectric liquid crystal composite material of the invention is prepared by a process comprising the steps of dissolving the organic polymer and the antiferroelectric liquid crystal material in a good solvent for the polymer or a mixture solvent of the good solvent and a poor solvent for the polymer, and subjecting the resulting solution to an appropriate film forming method such as solution casting, solution coating or spreading on water to form a film of the above mixture.

The antiferroelectric liquid crystal composite material of the invention may also be prepared by a process comprising the steps of mixing the curable resin or compound (comprised of polymerizable monomer and/or polymerizable oligomer) as the organic polymer and the antiferroelectric liquid crystal material, then molding the resulting mixture into a desired shape by for example injecting it between electrodes of a liquid crystal element, and curing the curable resin or compound contained in the mixture.

The curing of the curable resin or compound can be carried out in accordance with a conventional manner. For example, when the curable resin is a heat-sensitive curable resin, the heat-sensitive curable resin is cured by heating it substantially at a temperature higher than the reaction temperature of the heat-sensitive curable resin. When the curable resin is a radiation-sensitive curable compound, the radiation-sensitive curable compound is cured by irradiating it with radiation having a wavelength to which the radiation-sensitive curable compound is reactive.

In the process for preparing an antiferroelectric liquid crystal composite material according to the invention, the aforesaid mixture may be subjected to an electric orientation treatment or a magnetic orientation treatment during the step of molding the mixture in order to obtain an antiferroelectric liquid crystal composite material in which the antiferroelectric liquid crystal material is orientated in a given direction. Further, it is possible that the mixture is heated up to a temperature exceeding the highest temperature among temperatures at which the antiferroelectric liquid crystal material exhibits a liquid crystal phase and then slowly cooled during the molding step of the mixture.

In that case, the electric orientation treatment or the magnetic orientation treatment is preferably carried out together with the above-mentioned heat treatment. If such treatments as mentioned above are carried out during the molding step of the mixture, the antiferroelectric liquid crystal material can be orientated in a given direction in the antiferroelectric liquid crystal composite material. For example, when a magnetic field which is parallel with a film surface of the antiferroelectric liquid crystal composite material to be prepared is formed or a direct voltage is applied between the electrodes which hold the mixture therebetween, a major or longitudinal axis of the molecule of the antiferroelectric liquid crystal material is orientated in parallel with the film surface in the antiferroelectric liquid crystal composite material, whereby an antiferroelectric liquid crystal composite material containing an antiferroelectric liquid crystal material having a refractive index $n_e$ can be obtained, wherein $n_e$ is a refractive index of the antiferroelectric liquid crystal material at a major or longitudinal axis. On the contrary, when a magnetic field which is perpendicular to a film surface of the antiferroelectric liquid crystal composite material to be prepared is formed or an alternating voltage is applied to the electrodes which hold the mixture therebetween, a major or longitudinal axis of the molecule of the antiferroelectric liquid crystal material is orientated perpendicularly to the film surface in the antiferroelectric liquid crystal composite material, whereby an antiferroelectric liquid crystal composite material containing an antiferroelectric liquid crystal material having a refractive index $n_o$ can be obtained, wherein $n_o$ is a refractive index of the antiferroelectric liquid crystal material at a minor or lateral axis.

Especially when the organic polymer contained in the mixture is a curable resin or compound composed of for example a polymerizable monomer and/or a polymerizable oligomer, it is preferred to carry out the above-mentioned electric orientation treatment or magnetic orientation treatment. In this case, it is unnecessary to add a solvent, differently from the case of using the thermoplastic resin (A) as the organic polymer, and hence the antiferroelectric liquid crystal material can be smoothly orientated in a given direction in the antiferroelectric liquid crystal composite material without any hindrance by solvent.

In the process for preparing the antiferroelectric liquid crystal composite material according to the invention, the transparency of the antiferroelectric liquid crystal composite material is adjusted during the mixing step, in order to obtain a liquid crystal element having a large electrooptical contrast. In other words, the organic polymer and the antiferroelectric liquid crystal material are selected so that the antiferroelectric liquid crystal composite material sandwiched between two electrodes one of which is transparent has the highest transparency in such a state that a voltage is applied between the electrodes (referred to as "voltage applied state" hereinafter) or such a state that no voltage is applied between the electrodes (referred to as "no voltage applied state" hereinafter).

As described before, in the voltage applied state, a major axis of the molecule of the antiferroelectric liquid crystal material is orientated in the antiferroelectric liquid crystal composite material perpendicularly to the film surface, namely, electrode surface, and the antiferroelectric liquid crystal material contained in the antiferroelectric liquid crystal composite material has a refractive index $n_o$.

The antiferroelectric liquid crystal material contained in the antiferroelectric liquid crystal composite material prepared by a process including the aforementioned electric or magnetic orientation treatment has a refractive index $n_e$. On the other hand, the antiferroelectric liquid crystal material contained in the antiferroelectric liquid crystal composite material prepared by a process not including such treatment has a refractive index $n_{LC}$ which is an intermediate value between the refractive index $n_o$ and the refractive index $n_e$.

When the compound represented by the aforesaid formula [I] or [II] is used as the antiferroelectric liquid crystal material, the refractive index $n_{LC}$ f the antiferroelectric liquid crystal material represented by the formula [I] or [II] is usually in the range of 1.40 to 1.80, preferably 1.43 to 1.70. On the other hand, the refractive index $n_p$ of the organic polymer is usually in the range of 1.30 to 1.70, preferably 1.40 to 1.65, and hence any of differences in the refractive index between the antiferroelectric liquid crystal material and the organic polymer, $\Delta N = n_{LC} - n_p$, $\Delta N_o = n_o - n_p$ and $\Delta N_e = n_e - n_p$, can be adjusted to be within the range of 0 to ±0.15. Accordingly, it is preferred to use the compound of the formula [I] or [II] as the antiferroelectric liquid crystal material for preparing the antiferroelectric liquid crystal composite material of the invention.

When the above-mentioned refractive index difference $\Delta N$ or $\Delta N_o$ is within the range of 0 to ±0.15, the transparency of the antiferroelectric liquid crystal compostie material is high in the no voltage applied state, while in the voltage applied state light scattering occurs in the antiferroelectric liquid crystal composite material and the transparency of the antiferroelectric liquid crystal composite material becomes low. When the refractive index difference $\Delta N_e$ is within the range of 0 to ±0.15, the transparency of the antiferroelectric liquid crystal composite material is high in the voltage applied state, while in the no voltage applied state light scattering occurs in the antiferroelectric liquid crystal composite material and the transparency of the antiferroelectric liquid crystal composite material becomes low.

In the present invention, the organic polymer and the antiferroelectric liquid crystal material are selected so that the refractive index difference $\Delta N_e$ is adjusted to be within the range of 0 to ±0.15, then they are mixed while adding additives if necessary, and the resulting mixture is formed into a form of film. In this film-forming step, the electric orientation treatment or magnetic orientation treatment is preferably carried out to orientate the antiferroelectric liquid crystal material in a parallel direction with the film surface of the antiferroelectric liquid crystal composite material.

The conditions of the electric orientation treatment to orientate the antiferroelectric liquid crystal material in an almost parallel direction with the film surface of the antiferroelectric liquid crystal composite material vary depending on composition of the antiferroelectric liquid crystal composite material, thickness thereof, etc., and they cannot be limited specifically. However, it is desired to apply an alternating voltage of usually 10 to 200 V, preferably 50 to 150 V, at a frequency of usually 5 to 50 kHz, preferably 10 to 30 kHz, between the electrodes which hold the mixture therebetween in the film-forming step out of the mixture.

The antiferroelectric liquid crystal composite material prepared as above has a high electrooptical contrast as compared with the antiferroelectric liquid crystal composite material prepared without application of an electric field or a magnetic field in the film-forming step out of the mixture. That is, the antiferroelectric liquid crystal composite material prepared as above has a refractive index $n_o$ in the no voltage applied state. The absolute value difference $|n_o - n_e|$ between this refractive index $n_o$ and the refractive index $n_e$ in the voltage applied state is larger than the absolute value difference $|n_{LC} - n_e|$ between the refractive index $n_{LC}$ of the antiferroelectric liquid crystal composite material in the no voltage applied state and the refractive index $n_e$ thereof in the voltage applied state.

Liquid Crystal Element

The antiferroelectric liquid crystal composite material prepared as above can be used for light transmission type liquid crystal elements such as an optical switching element (e.g., optical shutter) and an optical modulation element; and light reflection type liquid crystal elements such as a display panel of a liquid crystal display device.

FIG. 3 shows an example of a liquid crystal element in which the antiferroelectric liquid crystal composite material of the invention is used.

In FIG. 3, a liquid crystal element 10 comprises a pair of electrodes 20, 20 substantially facing each other and an antiferroelectric liquid crystal composite material 1 filled between the electrodes 20, 20. In the antiferroelectric liquid crystal composite material 1, a plurality of insulating spherical particles 30 ... having almost the same diameters are dispersed, and owing to these plural insulating spherical particles 30 ..., a distance between the electrodes 20, 20 is kept constant.

At least one of the pair of electrodes 20, 20 is a transparent electrode, and through this transparent electrode an electrooptical change of the antiferroelectric liquid crystal composite material 1 filled between the electrodes 20, 20 can be observed.

That is, a liquid crystal element in which at least one of the electrodes 20, 20 is transparent but the other is not transparent is used as a light reflection type liquid crystal element, while a liquid crystal element in which both of the electrodes are transparent can be used as a light transmission type liquid crystal element or a light reflection type liquid crystal element.

In FIG. 3, each of the electrodes 20, 20 is composed of a transparent substrate 20a and a transparent electrode film 20b formed thereon, and each transparent electrode film 20b is in contact with the antiferroelectric liquid crystal composite material 1.

As the transparent substrate 20a, a glass substrate having a thickness of 0.01 to 1.0 mm is generally used. At least one of the transparent substrates may be a plastic film having a flexibility. In the case of using a glass substrate as the transparent substrate 20a, an undercoat layer mainly containing silicon oxide or the like is preferably provided between the glass substrate and the electrode film to prevent an alkali component eluted from the grass substrate from entering into the antiferroelectric liquid crystal composite material 1.

Suitable as the transparent electrode film 20b is ITO film having a thickness of 100 to 2,000 angstrom.

The insulating spherical particle 30 is used as a spacer to keep the distance between the electrodes 20, 20 constant, but the insulating spherical particle 30 may be replaced with other spacer such as an insulating inorganic fiber.

The liquid crystal element 10 shown in FIG. 3 is prepared as follows.

A weight ratio between the organic polymer and the antiferroelectric liquid crystal material contained in the antiferroelectric liquid crystal composite material 1 is adjusted to be within the range of usually 10:90 to 90:10, preferably 20:80 to 80:20. When the amount of the organic polymer contained in the antiferroelectric liquid crystal composite material is large and hence the antiferroelectric liquid crystal composite material 1 is in the form of a film and has sufficient self-supporting properties, a transparent electrode film 20b such as ITO film is formed on each surface of the filmy antiferroelectric liquid crystal composite material 1 in the form of a film by a known thin film forming method such as evaporation or sputtering. The antiferroelectric liquid crystal composite material 1 in the form of a film having the transparent electrode film 20b on each surface can be per se used as a liquid crystal element 10, but in general, a transparent substrate 20a such as a glass substrate is laminated on each of the transparent electrode film 20b by the use of for example an adhesive, to prepare a liquid crystal material 10.

On the contrary, when the amount of the organic polymer contained in the antiferroelectric liquid crystal composite material 1 is small and hence the antiferroelectric liquid crystal composite material 1 is semi-solid and does not have sufficient self-supporting properties, the liquid crystal element 10 is prepared, for example, by adding the aforementioned insulating spherical particles or insulating inorganic fibers to the antiferroelectric liquid crystal composite material 1 and sandwiching the antiferroelectric liquid crystal composite material 1 between a pair of electrodes 20, 20.

When the organic polymer used for preparing the antiferroelectric liquid crystal composite material 1 is a cured product of a curable resin or compound comprised of a polymerizable monomer and/or a polymerizable oligomer, etc. and a mixture of the organic polymer and the antiferroelectric liquid crystal material has sufficient fluidity, the liquid crystal element 10 may be prepared by adding the aforementioned insulating spherical particles or insulating inorganic fibers to the mixture, then putting the mixture into the space between the electrodes 20, 20, and curing the curable resin contained in the mixture. Also in this case, it is preferred to effect such a treatment that the antiferroelectric liquid crystal material contained in the antiferroelectric liquid crystal composite material 1 is orientated in parallel with the surfaces of the electrodes 20, 20.

In the manner as described above, there can be obtained a liquid crystal element 10 in which any of the difference values ($\Delta N$, $\Delta N_o$ and $\Delta N_e$) in the refractive index between the antiferroelectric liquid crystal material and the organic polymer has been adjusted to be within the range of 0 to $\pm 0.15$ in the transparent state. A liquid crystal element 10 in which the value of $\Delta N$ or $\Delta N_e$ has been adjusted to be within the range of 0 to $\pm 0.15$ is transparent in the no voltage applied state but is light-scattering in the voltage applied state, and hence it is suitably used as a liquid crystal element for a light-adjusting window glass for vehicles. Particularly preferred is a liquid crystal element 10 in which the value of $\Delta N_o$ has been adjusted to be within the range of 0 to $\pm 0.15$ because its electrooptical contrast is high.

The electrooptical contrast of the liquid crystal element 10 varies in accordance with a voltage applied to the liquid crystal element 10 and a thickness of the antiferroelectric liquid crystal composite material 1 contained in the liquid crystal element 10.

For example, if the liquid crystal element is intended to be used as a light-adjusting sheet or a light-adjusting glass, the thickness of the antiferroelectric liquid crystal composite material 1 which functions as a light-adjusting layer is usually in the range of 2 to 200 $\mu m$, preferably 5 to 100 $\mu m$, particularly preferably 7 to 40 $\mu m$, from the viewpoints of decrease of the voltage applied and heightening of the contrast.

The antiferroelectric liquid crystal composite material contained in the liquid crystal element of the present invention is as thick as explained above, but in spite of that, the liquid crystal element using this antiferroelectric liquid crystal composite material is higher in the electrooptical response speed than as expected from the thickness of the antiferroelectric liquid crystal composite material. This is presumably caused by that the antiferroelectric liquid crystal material contained in the antiferroelectric liquid crystal composite material of the invention is divided into plural droplets or domains and each of the droplets or domains is electrooptically controlled in the orientation of molecules which form each of the droplets or domains.

The liquid crystal element 10 obtained by the process as described above is transparent (or opaque) in the no voltage applied state, but changes to be opaque (or transparent) when a voltage is applied thereto in such a manner that an electric field not less than a given value may be formed between the electrodes 20, 20.

The liquid crystal element 10 using the antiferroelectric liquid crystal composite material 1 is high in the electrooptical response speed, and is free from occurrence of switching failure in contrast with a liquid crystal element using a ferroelectric liquid crystal composite material.

Moreover, the liquid crystal element 10 using the antiferroelectric liquid crystal composite material 1 has no memory effect. The liquid crystal element 10, however, can be used as a display panel of a liquid crystal display device by applying a bias voltage thereto so that the antiferroelectric liquid crystal composite material 1 transfers into an electric field region where the antiferroelectric liquid crystal composite material exhibits memory properties.

EFFECT OF THE INVENTION

By the use of the antiferroelectric liquid crystal composite material of the present invention, there can be obtained a liquid crystal element which is available at a low price, quick in the electrooptical response, free from occurrence of switching failure and is able to make a display screen large when used for a display device.

According to the process of the present invention for preparing an antiferroelectric liquid crystal composite material, an antiferroelectric liquid crystal composite material having such excellent properties as mentioned above can be provided.

Further, according to the present invention, a liquid crystal element which is transparent in the no voltage applied state and is able to change to light-scattering in the voltage applied state can be provided. The liquid crystal element obtained by the present invention is suitably used for a vehicle light-adjusting window glass, a display panel of a projection type large-sized screen display, etc.

EXAMPLE

Examples of the present invention are given below, but it should be construed that the invention is in no way limited to those examples In the following examples, "%" means "% by weight", unless specifically mentioned.

EXAMPLE 1

19.8% of trimethylolpropane triacrylate (ultraviolet curable monomer) as an organic polymer forming material, 0.2% of 2-hydroxy-2-methyl-1-phenylpropan-1-one as a polymerization initiator and 80% of the following compound as an antiferroelectric liquid crystal material were mixed together. To the resulting mixture was added a small amount of a silica powder having a mean particle diameter of 10 μm and they were mixed to prepare a composition for an antiferroelectric liquid crystal composite material. Antiferroelectric liquid crystal compound:
R-1'''-trifluoromethylheptyl-4-[4'-(1",2",3",4"-tetrahydro-6"-n-decyloxy-2"-naphthoyloxy]benzoate (compound exemplified by the formula [14-1])

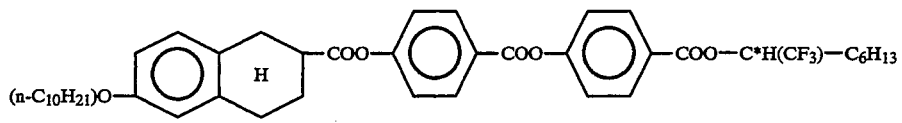

[14-1]

Independently, two of glass plates each having a size of 20 cm×20 cm were prepared, and on one surface of each glass plate was formed an ITO electrode film.

These two glass plates each provided with the ITO electrode film were arranged in such a manner that the ITO electrode films face each other, and the composition for an antiferroelectric liquid crystal composite material is injected between the ITO electrode films, to prepare a laminate for a liquid crystal element. The laminate thus obtained was allowed to pass through an ultraviolet light at a rate of 3.5 m/min to cure the ultraviolet curable monomer in the laminate. Thus, a liquid crystal element in which an antiferroelectric liquid crystal composite material of 11 μm thick comprising an organic polymer and an antiferroelectric liquid crystal material, both being in the dispersed state, was sandwiched between the transparent electrodes was prepared.

The curing conditions are as follows.
Light source: metal halide lamp (80 W/cm)
Irradiation energy amount: corresponding to 50 mJ/cm$^2$ A section of the liquid crystal element obtained as above was observed by means of a scanning type electron microscope, and as a result, an organic polymer having a three-dimensional network of the above-described monomer was found.

Then, a circuit was provided between the transparent electrodes of the liquid crystal element, and a transmittance of a light transmitted by the antiferroelectric liquid crystal composite material in the liquid crystal element was measured without application of a voltage to the liquid crystal element, that is, a transmittance in the no voltage applied state was measured. As a result, the transmittance was 10%.

Subsequently, the same transmittance as described above was measured while applying a direct voltage of 20 V to the liquid crystal element, that is, a transmittance in the voltage applied state was measured. As a result, the transmittance was 55%.

An electrooptical response time at the time when an alternating voltage of 80 V was applied to the liquid crystal element at a frequency of 10 Hz was also measured. As a result, the electrooptical response time was 910 μsec.

EXAMPLE 2

A liquid crystal element was prepared in a manner similar to that in Example 1 except that the antiferroelectric liquid crystal compound used in Example 1 was replaced with the following composition, 1-(4-isopropylphenyl)-2-hydroxy-2-methylpropan-1-one (available from Merk Co., trade name Dalocure 1116) was used as a polymerization initiator, the laminate for a liquid crystal element was heated until the whole substrate became 110° C. while applying an alternating voltage of 150 V between the transparent electrodes of the laminate, and the laminate in a state of rest was irradiated with ultraviolet light to cure the ultraviolet curing monomer in the laminate while cooling.

A transmittance of the liquid crystal element in the no voltage applied state, a transmittance thereof in the voltage applied state and an electrooptical response time were measured in the same manner as described in Example 10 As a result, the transmittance in the no voltage applied state was 90%, the transmittance in the direct voltage applied state was 60%, and the electrooptical response time was 820 μsec.

| | Weight ratio |
|---|---|
| | 5 |

| | Weight ratio |
|---|---|
| 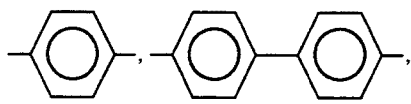 | 5 |
| 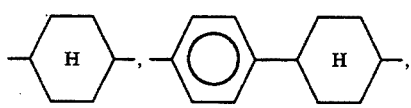 | 5 |
| 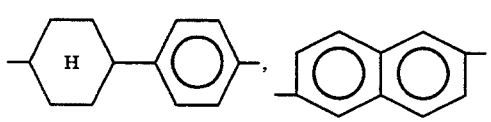 | 2 |

What is claimed is:

1. An antiferroelectric liquid crystal composite material comprising an organic polymer and an antiferroelectric liquid crystal material, said organic polymer and said antiferroelectric liquid crystal material being in the dispersed state, wherein the antiferroelectric liquid crystal material is represented by the followed formula (I)

$$R-X^1-(A^1-X^2)_l-(A^2-X^3)_m-(A^3-X^4)_n-Q^1-C^*H(Q^2)-Q^3 \quad (I)$$

wherein R is an alkyl group of 4 to 20 carbon atoms or a polyfluoroalkyl group of 4 to 20 carbon atoms, a part of —CH$_2$— group or a —CF$_2$— group present in said alkyl or polyfluoroalkyl group can be substituted with at least one group selected from —O—, —S—, —CO—, —CHX— (wherein X is a halogen atom), —O—CO—, —O—COO—, —COO— and —CH=CH— so that hetero atoms are not bonded to each other, said alkyl or polyfluoroalkyl group may have optical activity;

X$^1$ is a group selected form —COO—, —O—CO— and —O—, or a single bond;

X$^2$ and X$^3$ are each independently a group selected from —COO—, —O—CO—, —CH$_2$CH$_2$—, —CH$_2$O— and —OCH$_2$—;

X$^4$ is a group selected from —COO—, —CO—, —O— and —O—CO—;

A$^1$, A$^2$ and A$^3$ are each independently a group selected from divalent groups represented by the following formulas:

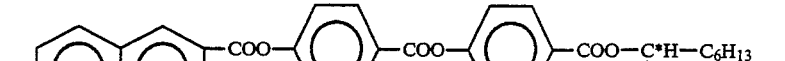

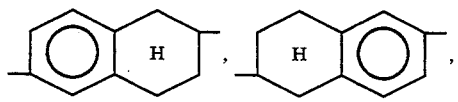

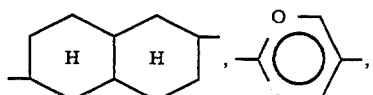

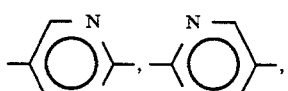

and

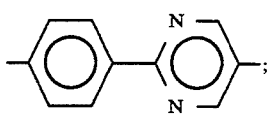

Q$^1$ is —(CH$_2$)$_q$— wherein q is an integer of 0 to 6;

Q$^2$ and Q$^3$ are each independently an alkyl group of 1 to 10 carbon atoms or a halogen atom, Q$^2$ and Q$^3$ are different from each other, both of Q$^2$ and Q$^3$ are not halogen atoms, and a part of —CH$_2$— group or —CF$_2$— group present in Q$^1$, Q$^2$ and Q$^3$ may be substituted with at least one group selected from —O—, —S—, —CO—, —CHX— (wherein X is a halogen atom), —CHCN—, —O—CO—, —O—COO—, —COO— and —CH=CH— so that hetero atoms are not bonded to each other;

l, m and n each independently represent 0 or 1; and a difference in a refractive index between the organic polymer and the antiferroelectric liquid crystal material is in the range of 0 to ±0.15 in a transparent state of said composite material.

2. The antiferroelectric liquid crystal composite material as claimed in claim 1, wherein the organic polymer is compatible with the antiferroelectric liquid crystal material and is a cured product of a curable resin or compound having no reactivity with an antiferroelectric compound.

3. The antiferroelectric liquid crystal composite material as claimed in claim 1 wherein $A^1$ is a group selected from

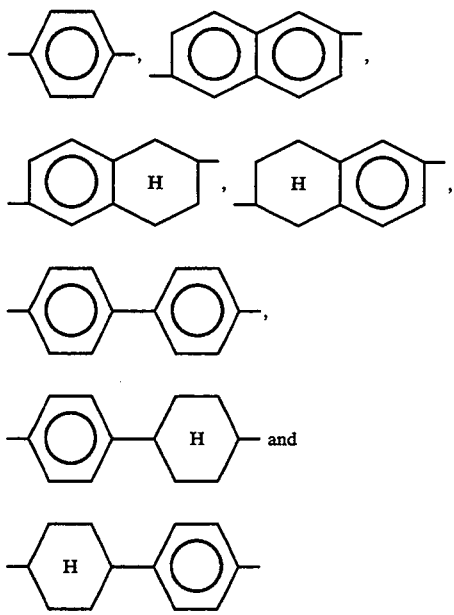

$A^2$ and $A^3$ are each independently a group selected from

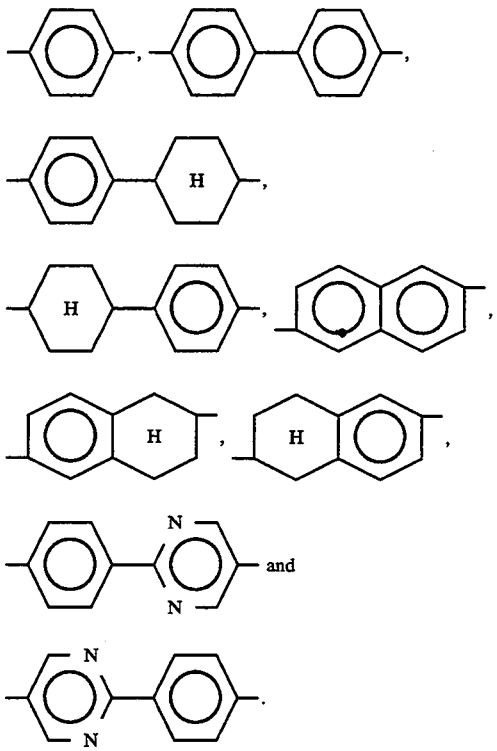

4. The antiferroelectric liquid crystal composite material as claimed in claim 1 wherein the antiferroelectric liquid crystal material is a compound selected from

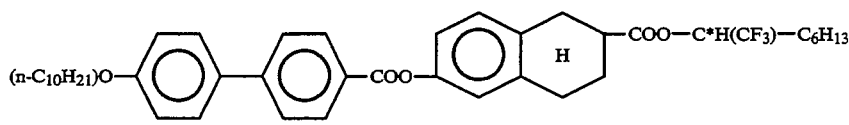

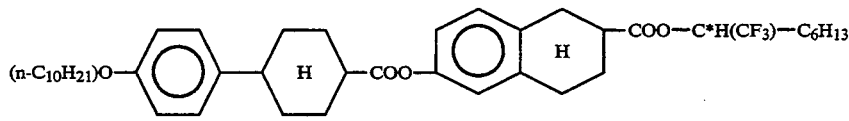

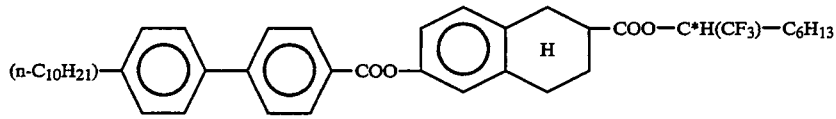

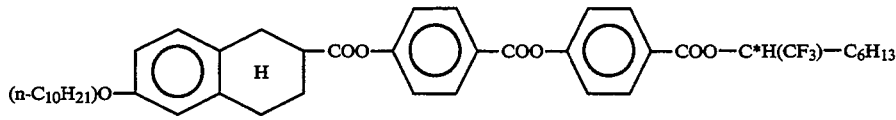

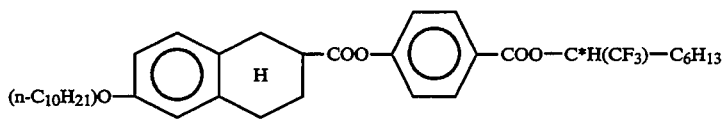

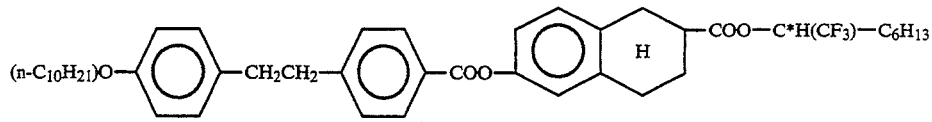

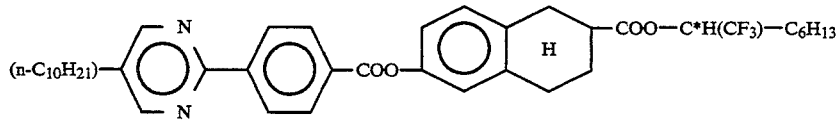

5. The antiferroelectric liquid crystal composite material as claimed in claim 1, wherein the antiferroelectric liquid crystal composite material is in the form of a film having a thickness of 2 to 200 μm.

6. The antiferroelectric liquid crystal composite material as claimed in claim 1, wherein a weight ratio between the organic polymer and the antiferroelectric liquid crystal material is in the range of 10:90 to 90:10.

7. A process for preparing an antiferroelectric liquid crystal composite material comprising a step of mixing an organic polymer and an antiferroelectric liquid crystal material, wherein the antiferroelectric liquid crystal material is represented by the following formula (I)

$$R\text{—}X^1\text{—}(A^1\text{—}X^2)_l\text{—}(A^2\text{—}X^3)_m\text{—}(A^3\text{—}X^4)_n\text{—}Q^1\text{—}C^*H(Q^2)\text{—}Q^3 \qquad (I)$$

wherein R is an alkyl group of 4 to 20 carbon atoms or a polyfluoroalkyl group of 4 to 20 carbon toms, a part of —CH₂— group or a —CF₂— group present in said alkyl or polyfluoroalkyl group may be substituted with at least one group selected from —O—, —S—, —CO—, —CHX— (wherein X is a halogen atom), —O—CO—, —O—COO—, —COO— and —CH=CH— so that hetero atoms are not bonded to each other, said alkyl or polyfluoroalkyl group may have optical activity;

X¹ is a group selected form —COO—, —O—CO— and —O—, or a single bond;

X² and X³ are each independently a group selected from —COO—, —O—CO—, —CH₂CH₂—, —CH₂O— and —OCH₂—;

X⁴ is a group selected from —COO—, —CO—, —O— and —O—CO—;

A¹, A² and A³ are each independently a group selected from divalent groups represented by the following formulas:

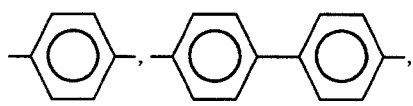

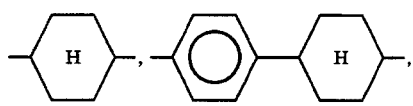

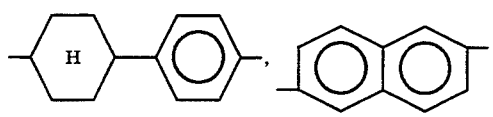

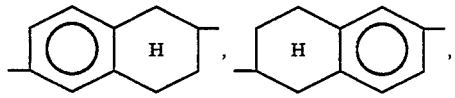

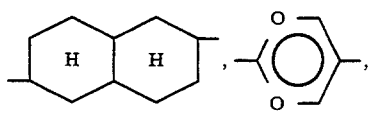

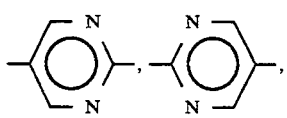

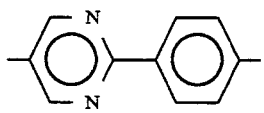

and

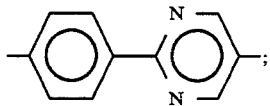

Q¹ is —CH₂)$_q$— wherein q is an integer of 0 to 6;

Q² and Q³ are each independently an alkyl group of 1 to 10 carbon atoms or a halogen atom, Q² and Q³ are different from each other, both of Q² and Q³ are not halogen atoms, and a part of —CH₂— group or —CF₂— group present in Q¹, Q² and Q³ may be substituted with at least one group selected from —O—, —S—, —CO—, —CHX— (wherein X is a halogen atom), —CHCN—, —O—CO—, —O—COO—, —COO— and —CH=CH—so that hetero atoms are not bonded to each other;

l, m and n each independently represent 0 or 1; and a difference in a refractive index between the organic polymer and the antiferroelectric liquid crystal material is in the range of 0 to ±0.15 in a transparent state of said composite material.

8. The process for preparing an antiferroelectric liquid crystal composite material as claimed in claim 7, wherein the organic polymer is compatible with the antiferroelectric liquid crystal material and is a cured product of a curable resin or a compound having no reactivity with an antiferroelectric compound; and said process comprises mixing the curable resin or compound with the antiferroelectric liquid crystal material and curing the curable resin or compound contained in the resulting mixture.

9. The process for preparing an antiferroelectric liquid crystal composite material as claimed in claim 8, wherein the curable resin or compound contained in the mixture is cured while applying an electric field or a magnetic field.

10. The process for preparing an antiferroelectric liquid crystal composite material as claimed in claim 8, wherein the mixture is heated up to a temperature exceeding the highest temperature at which the antiferroelectric liquid crystal material in the antiferroelectric liquid crystal composite material exhibits a liquid crystal phase, and then the curable resin or compound contained in the mixture is cured.

11. The process for preparing an antiferroelectric liquid crystal composite material as claimed in claim 10, wherein the mixture is heated up to a temperature exceeding the highest temperature at which the antiferroelectric liquid crystal material exhibits a liquid crystal phase, and then the curable resin or compound contained in the mixture is cured while cooling the mixture.

12. A liquid crystal element comprising a pair of electrodes facing each other at lest one of which is a transparent electrode and an antiferroelectric liquid crystal composite material filled between the electrodes, wherein the antiferroelectric liquid crystal composite material comprises an organic polymer and an antiferroelectric liquid crystal material, said organic polymer and said antiferroelectric liquid crystal material being in the dispersed state; said antiferroelectric liquid crystal material is represented by the following formula (I)

$$R-X^1-(A^1-X^2)_l-(A^2-X^3)_m-(A^3-X^4)_n-Q^1-C^*H(Q^2)-Q^3 \quad (I)$$

wherein R is an alkyl group of 4 to 20 carbon atoms or a polyfluoroalkyl group of 4 to 20 carbon atoms, a part of —$CH_2$— group or a —$CF_2$— group present in said alkyl or polyfluoroalkyl group can be substituted with at least one group selected from —O—, —S—, —CO—, —CHX— (wherein X is a halogen atom), —O—CO—, —O—COO—, —COO— and —CH=CH— so that hetero atoms are not bonded to each other, said alkyl or polyfluoroalkyl group may have optical activity;

$X^1$ is a group selected form —COO—, —O—CO— and —O—, or a single bond;

$X^2$ and $X^3$ are each independently a group selected from —COO—, —O—CO—, —$CH_2CH_2$—, —$CH_2O$— and —$OCH_2$—;

$X^4$ is a group selected from —COO—, —CO—, —O— and —O—CO—;

$A^1$, $A^2$ and $A^3$ are each independently a group selected from divalent groups represented by the following formulas:

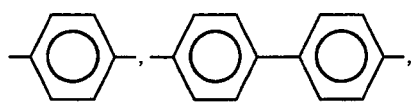

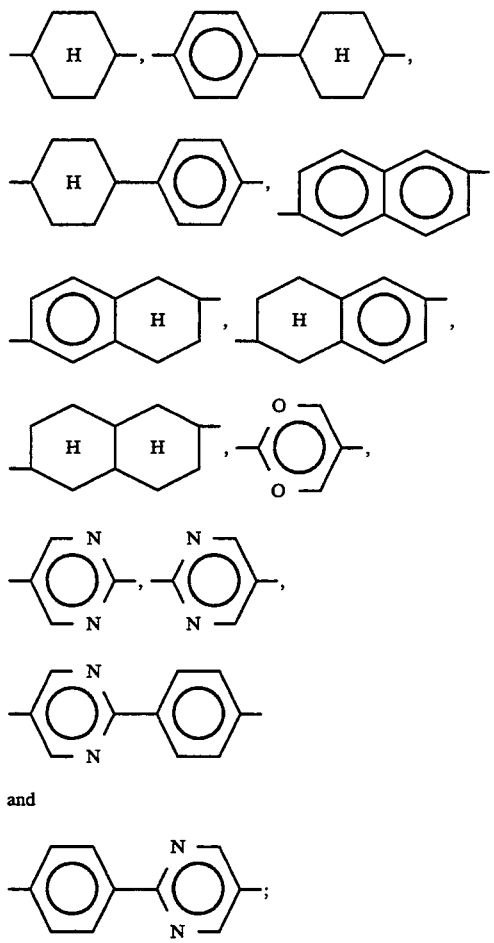

$Q^1$ is —$(CH_2)_q$— wherein q is an integer of 0 to 6;

$Q^2$ and $Q^3$ are each independently an alkyl group of 1 to 10 carbon atoms or a halogen atom, $Q^2$ and $Q^3$ are different from each other, both of $Q^2$ and $Q^3$ are not halogen atoms, and a part of —$CH_2$— group or —$CF_2$— group present in $Q^1$, $Q^2$ and $Q^3$ may be substituted with at least one group selected from —O—, —S—, —CO—, —CHX— (wherein X is a halogen atom), —CHCN—, —O—CO—, —O—COO—, —COO— and —CH=CH— so that hetero atoms are not bonded to each other;

l, m and n each independently represent 0 or 1; and a difference in a refractive index between the organic polymer and the antiferroelectric liquid crystal material is in the range of 0 to ±0.15 in a transparent state of said composite material.

13. The liquid crystal element as claimed in claim 12, which is transparent in a no voltage applied state but is able to change to show light-scattering properties when a voltage is applied between the electrodes.

14. The liquid crystal element as claimed in claim 12, which shows light-scattering properties in a no voltage applied state but is able to change to be transparent when a voltage is applied between the electrodes.

* * * * *